Nov. 18, 1941. T. W. DIKE 2,263,536
METHOD OF PATCHING LUMBER
Filed Sept. 25, 1939 2 Sheets-Sheet 1

Inventor:
Theodore W. Dike,
By Cushman Darby & Cushman
Attorneys.

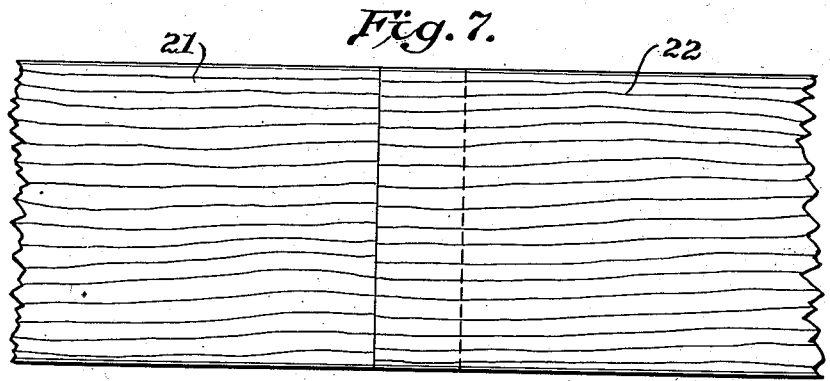
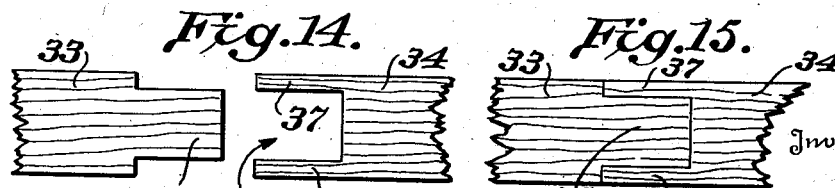

Patented Nov. 18, 1941

2,263,536

UNITED STATES PATENT OFFICE 2,263,536

METHOD OF PATCHING LUMBER

Theodore Williams Dike, Seattle, Wash., assignor to I. F. Laucks, Inc., Seattle, Wash., a corporation of Washington Application September 25, 1939, Serial No. 296,477

1 Claim. (Cl. 144—309)

My invention relates to new forms of wooden bodies made up of separate pieces joined together, and to the improved method which I employ in obtaining such products. More specifically, as to product, my invention relates to patched parallel-faced wooden bodies such as boards, veneer sheets, and plywood, and to lumber formed of short lengths with mating ends adhesively joined together.

In the lumber and plywood industry generally and more particularly in the manufacture of Douglas fir plywood the partial exhaustion of the best virgin timber has compelled the acceptance of increasingly defective veneer sheet stock which contain blemishes, such as small knots, pitch pockets, and the like which, if left in the sheets, would degrade the stock. For some time a determined effort has been made to remedy this by cutting out such defects by the use of saws, cutters, or punches, and then filling the cavity with some form of patch. One common method of patching has been to first remove the defect by the employment of a cutter formed with side edges which form an arc of a spherical surface and then insert in the cavity a corresponding patch which is boat-shaped due to the spherical form of the cutter.

By this method the edges of the cavity are cut at an angle to the perpendicular so that the opening in the veneer is somewhat greater on one face than the other. The sides of the cut thus have sufficient slope so that when a patch of identical shape and thickness is applied to the cavity, a very perfect fit is obtainable, at least theoretically. The corresponding patches are cut from strips of waste veneer of the same thickness by means of special spherically dished circular saws having spherical surfaces which are curved to correspond to a sphere of the same radius as the side edges of the cutter.

In applying patches of this character, the usual method has been to simply force the patch into the cavity on a table and then hold it in place by a piece of paper tape. If handled with care, the sheet can then be used in the manufacture of plywood, and the bottom of the patch eventually becomes glued in place by the action of the plywood glue which unites the assembled sheets to form the final plywood panel. In some instances also attempts have been made to initially glue the patch into the sheet by the use of a high water content aqueous adhesive applied to the patch or cavity.

With both methods a number of serious difficulties have been encountered. If no glue is directly applied to the edges of the cavity, there is no adhesive union at the edges except where glue is irregularly forced up from the plywood glue line below, when the plywood is pressed. Frequently, where the patches are not extremely tightly fitted, an excess of the thin highly alkaline plywood glue oozes up through the crack and forms a stain on the surface of the panel, and where this does not occur, the undesirable result remains that a large proportion of the edges of the patch are left without any bond to the adjacent edges of the sheet. If, on the other hand, glue is applied to the edges of the patch, the patch takes up water from the high water content glue, causing it to swell and become too large for the cavity which results in a poor fit which often splits the veneer. Also, the patching glues which have been used hitherto, not only have a high water content, but, if they are water-resistant, they also are highly alkaline which causes staining so that the patch is outlined by a stained line around its margin which forms a serious blemish, or if a stainless glue is used, the blemish may be avoided, but available so-called stainless glues have been non-water-resistant, not really water white or colorless, and they have also carried such a high water content as to cause serious difficulties by swelling the patches. Another trouble has been that, in any case, the patch has to be held temporarily in its place by means of a strip of adhesive paper tape which in turn causes various difficulties in finishing the panels either by indenting the wood due to its thickness during the pressing process and so producing a blemish upon sanding, or else causing some difficulty in the sanding operation due to the gummy character of the adhesive on the paper. The tape also hides some of the surface of the sheet and often conceals blemishes which have not been fully removed which reappear when the panel is finally sanded so that the finished panel has to be patched again by hand labor.

Thus, it is seen that patching has been a very troublesome and unsatisfactory expedient, and a method of patching which would be free from these difficulties has been very much desired. In particular, a method is desirable which will adhesively unite all the edges of the patch with a wholly colorless, stainless, invisible bond of good strength so as to form a really homogeneous patched sheet, and this result has also been needed to completely seal up the edges of the cavity so as to prevent any of the alkaline plywood glue oozing up to the surface from the glue line below and causing local stains. The present invention attains both these objectives, with a number of other advantages which include a strong water-resistant invisible bond all around the edges of the patch, the entire elimination of the objectionable tape and ability to apply the patches with great rapidity. The swelling trouble is also entirely eliminated so that patches which are accurately cut to exactly fit the corresponding cavity at last do actually fit perfectly without any tendency either to swell or shrink independently of the sheet to which they are applied.

To the accomplishment of the foregoing and related ends, the invention then comprises the features hereinafter fully described, and particularly pointed out in the claim, the following description setting forth in detail certain illustrative embodiments of the invention, these being indicative, however, of but a few of the various ways in which the principle of the invention may be employed.

After much experiment I have finally found a method of application which meets all these exacting requirements so as to completely solve this troublesome problem. I find that all the conditions can be met by using as the adhesive a colorless water soluble quick-setting non-alkaline urea-formaldehyde thermosetting resin capable of producing a low viscosity water solution having a high concentration of solids. The latter feature permits the great economy of applying the adhesive simultaneously to the edges of a large number of patches by spraying, while the stains are eliminated by the colorless feature so that the glue bond is invisible, while the quick-setting character permits a fast patching process by a very short application of heat and pressure.

By this means I have obtained a new and useful form of patched sheet characterized by an invisible but strong and water-resistant bond all around the edges of the patch which, in the case of veneer used in plywood manufacture, entirely prevents the alkaline plywood glue seeping up from the plywood glue line below and staining the surface. Not only are the stains eliminated, but the patch at last becomes an integral part of the board, sheet of veneer or resulting plywood, for it is at all points firmly welded thereto and except for any difference in grain which may occur between the patch and the surrounding wood, the physical union between the two is complete and yet invisible. The bond is also as strong as the wood and not affected by moisture.

Urea-formaldehyde resins of this character are easily produced by known methods having the desired characteristics and are obtainable in the market either as low viscosity fairly stable syrups having high solid contents of 40% and upwards or in the form of a very stable water soluble powder. I prefer to use the resin in the powder form because of the greater stability in storage, as well as the economy and ease of handling. It is important that a resin be selected which is of the quick-setting type, since the output of my process depends almost entirely on this feature, and, while with a very quick-setting resin patches can readily be set in 2 to 2½ seconds, a slow setting resin will usually require three or four times as long with a correspondingly great falling off in output.

While urea-formaldehyde resins in general are applicable, I have found thus far that the fastest resins are those which are made from urea, formaldehyde, and zinc chloride by the method described in U. S. Patent No. 1,992,180 issued to Albert Henry Bowen and myself. These resins in the form of stable water soluble spray dried powders, are preferred for the operation of the present invention.

When applied in the form of a spray containing about fifty per cent of solids, the coating dries up in a few minutes to form a resinous film on the edges of the patches, and there is very little penetration and no detectable swelling of the wood. Of course, brushing or dipping may also be used to apply the resin, but I find that spraying is not only much cheaper and quicker, but it also has the advantage of making it easier to avoid applying an excess which might carry enough water into the wood to cause swelling. Another advantage of the urea-formaldehyde resins in general which is particularly marked in the case of the zinc chloride containing resins, is their freedom from any tendency to stick to the smooth surface of a hot iron when the latter is used as a hot pressing element to set the patches in place.

In patching veneer by my improved method, I mix up a suitable water soluble powdered resin with about one part of water by weight to one of resin, choosing a condensation product which has been only slightly polymerized so that it will have a relatively low viscosity and high solubility and thus be readily sprayable when mixed with an equal weight of water. I find that a desirable viscosity for spraying is ordinarily between five and ten, #26 wire MacMichael. Having cut a supply of patches, I register a large number of them together so as to expose their edges and lightly spray the edges with the resin solution and then allow the patches to dry for about an hour. After that, with a resin of good stability, I find that they are useful for a period of a week or more. I then apply the patches in the cavities with heat and pressure, using pressure well up towards the crushing limit of the wood, sufficient to force the walls of the patch against the walls of the cavity, and heat sufficient to convert the resin. In ordinary practice, I find that the mechanical pressure applied to the flat surface of the patch and surrounding sheet with Douglas fir veneer should be of the order of 200 lbs. to the square inch and the heat should be in excess of 250° F. and preferably as high a temperature as can be used without scorching the surface of the veneer during an application of one to five seconds according to the thickness of the sheet which is being patched. By this method with accurately cut patches I find it is possible to patch $\frac{1}{16}$" Douglas fir in two and one-half seconds which, with convenient facilities, produces a very large output. The patches firmly adhere all around the edge and are so well sealed that there is no trouble with alkaline plywood glue seeping up to the surface around the patch when the sheets are glued up in making the plywood. The patches are also so firmly secured in the sheet that there is no necessity for applying the paper tape, and the amount of moisture carried into the patch by the highly concentrated aqueous resin solution is negligible and has no tendency to swell the wood so that patches which are cut originally to a good fit, fit satisfactorily in all cases.

I find also that this method may be used with patches which have either oblique or even straight sided edges provided mechanical pressure used in fitting the patch is substantial so that the wood both of the patch and of the adjacent sheet is temporarily slightly compressed, and the surfaces to be joined are forced against each other during the setting of the resin. This method may also be used in patching or plugging knot holes and defects in boards or wood sheets of substantial thickness with the limitation that owing to the thickness of the edge it is not usually practical to convert the resin by direct application of heat and pressure except in the portions immediately adjacent to the outer surfaces. In many cases this is sufficient to hold the patch or plug satisfactorily, but where a bond is desired throughout the whole thickness of the edges, this may be secured by passing the stock through a heated kiln for a sufficient period to raise the entire thickness to the conversion temperature, in which case a secure bond is formed when the patches or plugs are a close fit in the cavities so that the surfaces to be united are already in close contact. In that case, all that is required is to heat the assembly sufficiently to melt the resin and convert it to the final insoluble infusible compound. In some cases, also, the patch may be merely pressed into the cavity and the whole conversion of the resin be accomplished in a dry kiln without any preliminary hot pressing. This is an especially cheap process, very useful in patching sawn lumber.

It is thus seen that the present method at last attains the much desired objective of producing sound, homogeneous, blemish-free wood sheets, boards, slabs, veneer, and the like from originally low grade defective stock and, owing to the combined intimacy and invisibility of the union, together with its strength and water-resistance, the properties of an originally clear piece of lumber are obtained without any sacrifice of physical properties due to material which has replaced the defective material removed. It will also be noted that all the troublesome problems of patching veneer in plywood manufacture are solved and that an inexpensive and efficient method for the use of low grade sheet stock has been provided.

Another important application of the invention is found in the production of standard, or adequate, lengths of lumber or plywood from two or more short pieces of similar section provided with mating or scarfed ends adhesively united by an adhesive of the type above discussed. The fitted ends of the pieces have the adhesive applied thereto, are placed in engagement with each other, and then the joint is subjected to heat and pressure between metal plates, just as in the case of the patched wooden bodies. This method is particularly applicable where the applied glue is sufficiently near the outer surfaces so as to be quickly set. In other cases the joined pieces may be passed through a heated kiln for the purpose of converting the glue.

Without further general discussion, I shall proceed to describe the invention with reference to the illustrative embodiments shown in the drawings, in which:

Figure 7 is a plan view of a portion of a piece of lumber formed by joining two short pieces in end-to-end relation;

Figure 8 is a side elevation, enlarged, showing the tongued and grooved ends, before the joint is closed, of the pieces appearing in Figure 7;

Figure 9 is a side elevation, enlarged, of the body shown in Figure 7;

Figure 10 shows the adjacent ends of two pieces of lumber shaped to provide a shiplap joint with re-entrant angles;

Figure 11 shows the pieces of Figure 10 with the joint closed;

Figure 12 is an elevation of the adjacent ends of two strips of lumber formed to provide an ordinary shiplap joint;

Figure 13 shows the parts of Figure 12 with the joint closed;

Figure 14 shows an elevation of the adjacent ends of two relatively thick boards tongued and grooved;

Figure 15 shows the parts of Figure 14 with the joint closed, and

Figure 16 shows an elevation of the joint between two pieces united in accordance with the invention with the utilization of a different form of scarfing.

Figure 1:
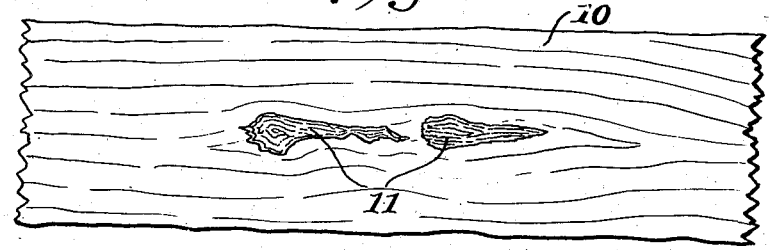
Figure 1 is a partial face view of a veneer sheet, by way of example, showing a defective portion which is to be replaced in accordance with the present invention.
Figure 2:
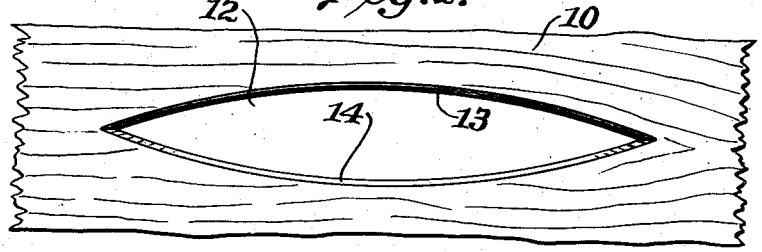
Figure 2 is a view similar to that of Figure 1 showing the sheet after the removal of the defect.
Figure 5:
Figure 5 is a section of a plywood panel including the patched sheet of Figure 4 as a face ply.

Referring to the drawings, the veneer sheet 10 (Fig. 1) has defective portions 11 resulting from the presence of knots, holes, or other imperfections. In Figure 2, the defects have been removed leaving a lenticular or boat-shaped cavity or opening 12 formed in the sound wood of the sheet and extruding from face to face of the latter. The edges 13 and 14 of the opening are spherically concaved and oblique, giving the beveled effect most clearly observable in Figure 5.

Figure 3:
Figure 3 is a face view, reversed, of a patch in accordance with the invention.
Figure 4:
Figure 4 shows the sheet of Figure 2 with the patch of Figure 3 applied.

Reference numeral 15 (Fig. 3) represents a lenticular or boat-shaped patch or plug of the same size as the opening 12 in Figure 2 and of the thickness of the veneer sheet, and the edges 16 and 17 of this patch are transversely convexed and oblique so as to mate with the edges 13 and 14 of the hole or cavity 12.

The edges 16 and 17 of the patch 15 are supplied with an adhesive of the nature heretofore discussed, and this adhesive, as above-mentioned, may be permitted to dry for a period. The patch is then applied to the opening 12 and pressure and heat applied. The pressure assures intimate contact of the peripheral surfaces and that the faces of the veneer sheet and patch will be coplanar. When the glue has set the joint between the patch and the surrounding wood will be scarcely perceptible and the patched ply will be as serviceable as an originally perfect ply. The grain of the patch is preferably selected to run in the direction of the grain of the ply as a matter of strength and appearance. The veneer sheet may now be united with other plies to form a panel, a portion of such a panel being shown in Figure 5. Either face of the patched sheet may be exposed.

Figure 6:
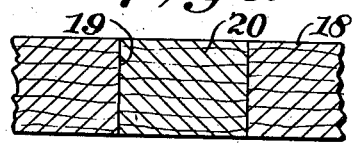
Figure 6 is a section of a portion of a board which has been patched in accordance with the invention.

In Figure 6, reference numeral 18 designates a board in which an imperfection has been replaced by a cylindrical bore hole 19 and the hole plugged by a tightly fitting cylindrical patch 20 with glue applied to the contacting surfaces, the grain of the patch preferably running with the grain of the board. The hole and plug may, of course, be conical or flared. As previously mentioned, the glue may be converted throughout by passing the patched board through a suitable heated kiln.

As has been hereinbefore stated, I preferably apply the glue directly to the edge or peripheral surface of the patch. Obviously, the glue might be applied to the bounding surfaces of the opening to be plugged or to the latter surfaces as well as to the edge of the patch. Accordingly, when in the claim reference is made to supplying glue to the edges or peripheral surfaces of the patch, I contemplate any of the procedures just mentioned; i. e., either direct application or transfer from the coated cavity boundaries.

In Figure 7, reference numerals 21 and 22 designate two parallel faced wooden strips of the same geometrical cross section united in end-to-end relation, in accordance with the invention, to provide a slat of useful length with coplanar surfaces. The end of the piece 21 is provided with a tongue 23 and the end of the piece 22 is provided with a groove 24 adapted to receive the tongue 23 with a close fit. Adhesive is applied to the tongue or slot, or both, the tongue is inserted in the slot, and then the joint is subjected to heat and pressure between metal plates. Due to the proximity of the glue coated surfaces to the faces of the slat, conversion of the adhesive is readily effected. The completed joint appears in Figure 9. The slat of Figure 7 has the standard width of a Venetian blind slat, although in Figures 8 and 9 the proportions are doubled for the sake of clarity. Due to the lapped portions of the individual pieces at the joint and to the strength of the adhesive, a slat equal in strength to an originally integral slat is obtained. The joining operation is quickly carried out and naturally brings about great savings, since short pieces heretofore discarded are put to use.

In Figure 10 the strips 25 and 26 are formed with tongues 27 and 28 to provide a shiplap joint with the re-entrant angles 29 and 30. Adhesive is applied to one or both of the tongues, and the pieces are united, as before, under pressure between heated metal plates to give the completed joint shown in Figure 11.

In Figure 12 the ends of the strips 31 and 32 are formed to provide the ordinary form of shiplap joint, the completed joint being shown in Figure 13.

Figure 14 shows the adjacent ends of boards 33 and 34 provided respectively with a tongue 35 and a groove 36. In this case the groove is shown as being relatively wide so as to keep the glue lines close to the outer faces where they are readily reached by the heat. For example, with boards thirteen-sixteenths of an inch thick, the flanges 37 and 38, which define the groove, may be merely an eighth of an inch thick each, as shown. Figure 15 shows the joint as completed in a hot press. It will be understood that with the glue lines further inwardly from the faces so as not to be readily accessible to heat, the joint may be completed in a heated kiln. The fit of the tongue and groove is made tight throughout so that, desirably, the parts will be held together by friction until the glue has set.

In Figure 16 the lapped ends of the wooden pieces 39 and 40 have complementary flat oblique or beveled faces 41 and 42 adhesively united in accordance with the invention. Direct application of heat and pressure is ordinarily desirable in producing such a joint.

Other modes of applying the principle of the invention may be employed, change being made as regards the details described, without departure from the following claim.

I claim:

The method of curing a defect in sawn lumber which comprises cutting out the defect to provide an opening in the sound wood, forming a wooden plug of a size to fit tightly into the opening, supplying a thermosetting adhesive to the periphery of the plug and inserting it in the opening, applying setting heat and sufficient pressure to the plug and surrounding area so that as a result of their compression the surfaces to be joined are forced against each other and the adhesive is set adjacent the ends of the plug, and completing the setting of the adhesive throughout the thickness of the lumber by passing the patched lumber through a zone heated to at least the conversion temperature of the adhesive.

THEODORE WILLIAMS DIKE.